(12) United States Patent
Rankins et al.

(10) Patent No.: US 7,280,351 B2
(45) Date of Patent: Oct. 9, 2007

(54) STORING A STRUCTURE WITHIN AN ELECTRONIC DEVICE

(75) Inventors: Walter James Rankins, Houston, TX (US); Earl Moore, Cypress, TX (US); Steven S. Homer, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 284 days.

(21) Appl. No.: 10/989,047

(22) Filed: Nov. 15, 2004

(65) Prior Publication Data

US 2006/0023415 A1    Feb. 2, 2006

Related U.S. Application Data

(63) Continuation-in-part of application No. 10/903,106, filed on Jul. 30, 2004.

(51) Int. Cl.
*G06F 1/16*    (2006.01)

(52) U.S. Cl. ...................................... 361/683

(58) Field of Classification Search ................ 361/679, 361/683, 686
See application file for complete search history.

(56) References Cited

U.S. PATENT DOCUMENTS

| | | | |
|---|---|---|---|
| 6,035,350 A | 3/2000 | Swamy et al. | |
| 6,091,404 A | 7/2000 | Hong et al. | |
| 6,219,037 B1* | 4/2001 | Lee | 345/167 |
| 6,476,795 B1* | 11/2002 | Derocher et al. | 345/163 |
| 2004/0140955 A1 | 7/2004 | Metz | |
| 2005/0270735 A1* | 12/2005 | Chen | 361/683 |

FOREIGN PATENT DOCUMENTS

| | | |
|---|---|---|
| EP | 1400890 | 3/2004 |
| EP | 1443387 | 8/2004 |

* cited by examiner

*Primary Examiner*—Yean-Hsi Chang (57) ABSTRACT

An exemplary rechargeable mouse is adapted to be insertable into and removable from a bay of an electronic device. An electrical connection of the mouse electrically couples only to a power connection of an electrical interface in the device bay that also has a data connection such that the mouse is charged when inserted in the device bay.

13 Claims, 9 Drawing Sheets

//STORING A STRUCTURE WITHIN AN ELECTRONIC DEVICE

This application is a continuation-in-part of U.S. patent application Ser. No. 10/903,106, filed on Jul. 30, 2004 in the names of Solomon, Moore, Harris, Doczy, Anderson, Faulk, and Griebenow, which is hereby incorporated by reference in its entirety.

BACKGROUND

As computers and other electronic devices advance, these devices are evolving to be more multifunctional. For example, as portable and handheld computers have increased in processor power, screen resolution, and screen size, they have become capable of functioning as multimedia platforms that may be used to play music, movies, or games. Similarly, digital cameras and camcorders may store video files which, when the device is connected to a television, monitor, or computer, may be played by the device. As another example, music players and other audio playback devices may be used to play stored audio files on a connected computer or stereo system.

In some instances, users may prefer to utilize these electronic devices with specific controls or accessories. For example, a user may prefer a gaming experience using a game controller or interface similar to that employed when using a dedicated gaming console. Similarly, a user watching video or listening to music stored on a portable electronic device may desire to use a familiar remote control or interface.

However, to the extent that portable and handheld computers, as well as other types of portable electronic devices, are designed to be easily and conveniently transported, it is inconvenient to carry separate equipment, such as controllers, cables, connectors, and so forth, with the device. Similarly, to the extent that the portable electronic devices may use insertable memory media, such as memory cards or sticks, it may be undesirable to carry additional, loose media with the device.

DETAILED DESCRIPTION

As discussed below, certain embodiments of the present invention comprise a method, apparatus, or system for storing auxiliary equipment for use with an electronic device, such as a portable or handheld computer, a personal digital assistant (PDA), a digital camera or camcorder, an audio player (such as a player configured to play files in accordance with a Motion Picture Experts Group, Audio Layer 3 (MP3) standard), or other portable or non-portable electronic devices. Some exemplary embodiments utilize user-accessible peripherals or memory device bays in the housing of the electronic device that are configured to interface with insertable components or media, such as peripheral cards, storage devices, or memory cards. For example, a device bay, as discussed herein, may comprise one or more peripheral card slots, such as slots configured to receive peripheral cards adhering to a Personal Computer Memory Card International Association (PCMCIA) standard or an express card standard. Similarly, a device bay may comprise slots adapted to engage and read various media, such as optical disks, magnetic disks, memory cards, or other memory media. Furthermore, a device bay may comprise a bay or compartment configured to accommodate a storage device or reader, such as optical and floppy disk drives or removable hard drives. Such a device bay, when not occupied by the peripheral device, memory media, storage device, etc. for which it is configured, may instead be used to securely store other structures or equipment.

Figure 1:
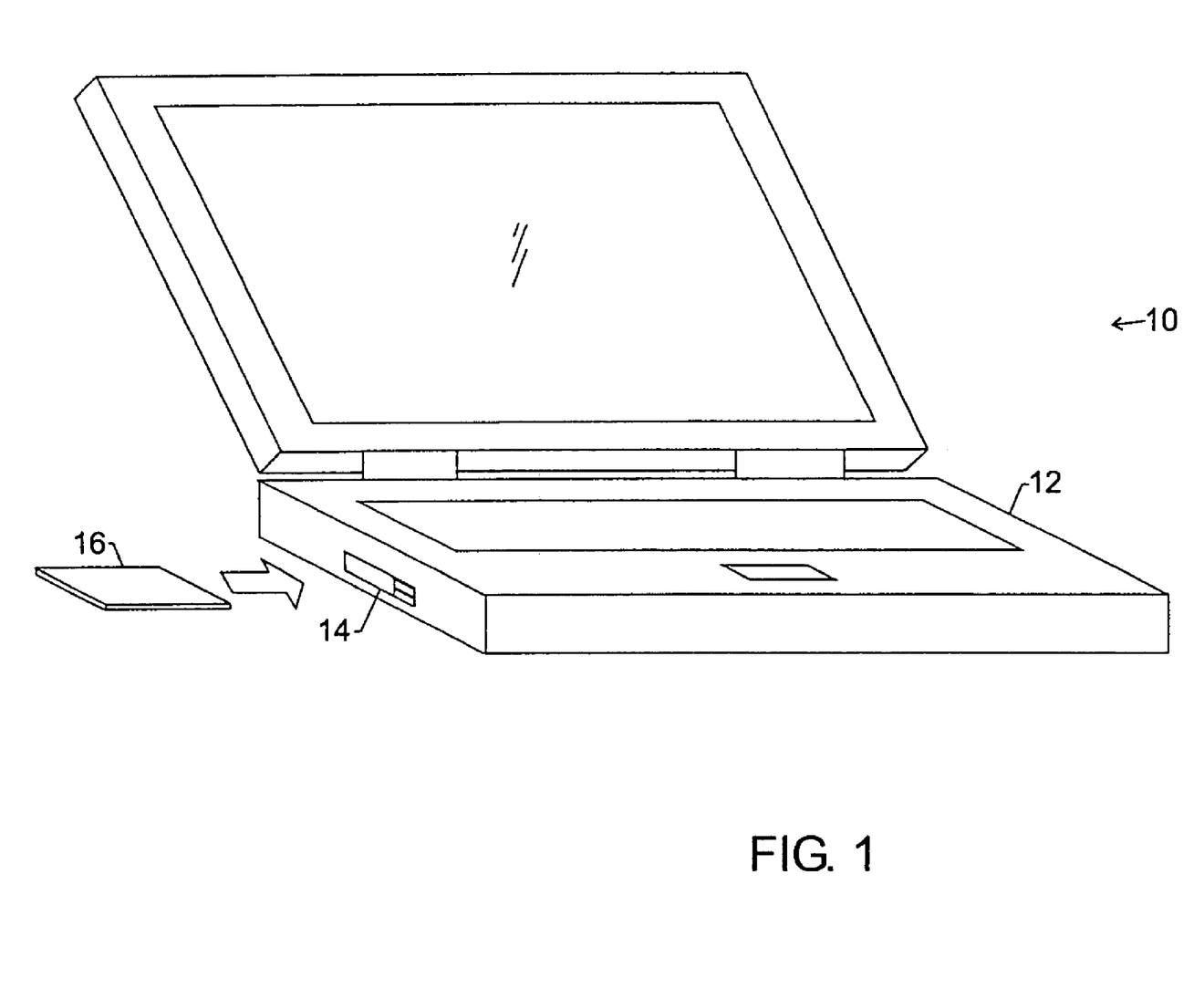
FIG. 1 depicts an embodiment of a portable computer and an insertable structure, in accordance with aspects of the present invention.

Turning to the figures, FIG. 1 depicts an embodiment of an electronic device in the form of a portable computer 10, such as a laptop, notebook, or tablet computer. The housing 12 of the portable computer 10 includes a variety of device bays configured to receive removable components or media that operate within the bay. For example, a device bay may be configured to directly connect to a suitably configured device, such as by an electrical interface, when the device is inserted into the bay. When so connected, the inserted device may operate with other components with which it is electrically connected, such as with a bus, memory, or processor in the interior of the portable computer 10. For example, the housing 12 includes one or more peripheral card slots 14, such as PCMCIA or express card slots, that are configured to electrically interface/connect with a peripheral card, such as a network adapter, modem, or removable hard drive. As will be appreciated, peripheral cards of this type are generally designed to provide increased functionality to the portable computer 10 when inserted into a respective bay or slot such that they properly interface with a respective electrical connector when inserted into the bay. However, many structures such as, and without limitation, electronic apparatuses, storage containers, chargeable structures, etc., can be configured so as to lack a suitable connector to directly connect to the bay's interface, although such structures may interact with the electronic device via other communication avenues, e.g., a wireless connection, a separate cable to connect to a dedicated outlet in the device housing, etc.

When the functionality provided by a peripheral card or other removable device is not needed, the corresponding bay, such as the depicted peripheral card slot 14, may be vacant. In such circumstances, the vacant bay is utilized, in accordance with embodiments of the present invention, to securely store other equipment or devices, such as the structure 16. For example, when not in use, the structure 16 is configured to be able to reside in a bay, where residing is defined to encompass being retained in, fitting within, or being positionable partly, entirely, or mostly within the confines of the bay. When a user wishes to remove a structure 16 residing in a bay, the structure 16 is ejected using the ejection mechanism typically used to remove the peripheral card or other removable device for which the slot or bay is configured. Alternately, in other embodiments, the user simply pulls on the structure 16 with sufficient force to overcome the resistive or engaging force holding the structure 16 within the bay, such as the peripheral card slot 14.

In one implementation, the structure 16 is an electronic apparatus, such as a universal serial bus (USB) hub or an input device or a control device, that communicates with or connects to the portable computer 10. Communication or connection to the portable computer 10, however, does not have to occur via the connectors present within the slot or bay in which the structure 16 is stored. For example, the structure 16 may be a controller or other input device which, when not stored within the bay, may communicate, without limitation, with the portable computer 10 via wireless means, such as over the infrared or radio frequencies, or via a cable connection to a dedicated interface in the housing of portable computer 10. Examples of some electronic apparatuses would be a remote control, a game controller, and optical and non-optical mice.

In another embodiment, the structure 16 connects to the connector(s) within a respective bay, such as peripheral card slot 14. For example, structure 16 can be connected within a bay to charge a battery of structure 16. In one exemplary embodiment, a connection between the structure 16 and the connector(s) enables power, but not data, to pass between the structure 16 and portable computer 10 or other electronic device. In this manner, a chargeable component of the structure 16, such as a battery, may charge from a power supply of the portable computer 10 or from power delivered to the portable computer 10, such as via an AC power cord plugged into an electrical outlet. In such an embodiment, the structure 16 is charged when not in use, (i.e., when stored in a device bay), so that the charged structure 16 is ready for use (i.e., its intended functionalities) when removed from the bay or at other times. For example, the controller or input device of the preceding example may include a chargeable battery that is charged when stored in the bay via a limited or dedicated connection to an electrical interface within the depicted peripheral card slots 14. In such a limited interface, minimal or no communicative connection exists between the structure 16 and the portable computer 10 or other electronic device.

While the structure 16 may be an electronic device, as set forth in the preceding examples, it may also be a simple mechanical structure, such as a storage container. In such an embodiment, the structure 16 may be used to store any item capable of fitting into the structure 16. For instance, equipment for use with the portable computer 10 or with other electronic devices may be stored in this manner. For example, a storage structure may be used to store a variety of memory media that may be read by the portable computer 10 or by another electronic device. Examples of such storable memory media include memory sticks, memory cards, including secure digital (SD) memory cards, multimedia cards (MMC), mini-optical disks, and so forth. Similarly, cables, such as network, telephone, or USB cables usable with the portable computer 10 or with other electronic devices, may be stored in a suitable structure 16. However, items unrelated to the use of the portable computer 10, such as paper clips, rubber bands, gum, and so forth, may also be stored in this manner so that a user may store and carry other items, even if not related to the use of the electronic device.

Figure 2:
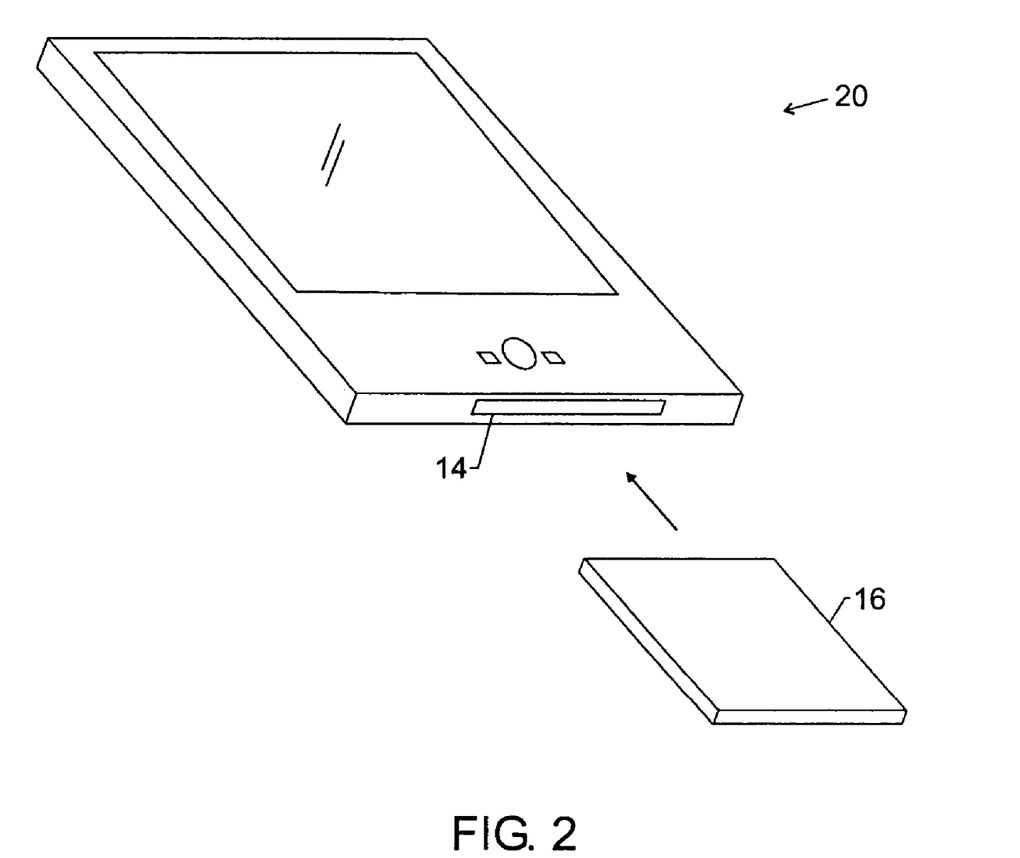
FIG. 2 depicts an embodiment of a handheld computer and an insertable structure, in accordance with aspects of the present invention.

Embodiments in accordance with the present invention include a wide variety of portable and/or non-portable electronic devices. For example, referring now to FIG. 2, a portable electronic device, such as a PDA or handheld computer 20, is depicted. The portable electronic device includes a user-accessible device bay, such as a memory card slot or a peripheral card slot 14, which may be used for storage and/or other functions when slot 14 is vacant. Similarly, other electronic devices, such as MP3 and other audio players, digital cameras and camcorders, portable digital video disk (DVD) players, and so forth, may include compartments or bays for the insertion of functional components or memory media which, when empty, may be used to store other equipment or media for use with the device or another electronic device.

The following discussion provides examples of different structures 16 that may exemplify or expand upon some of the concepts discussed above. For the purpose of illustration, the following examples will be discussed in the context of storage within peripheral card slots, particularly PCMCIA card slots. However, in view of the preceding discussion, one of ordinary skill in the art will appreciate that other device bays are also contemplated for storing devices and structures in accordance with embodiments of the present invention and that the following examples are merely illustrative.

Figure 3:
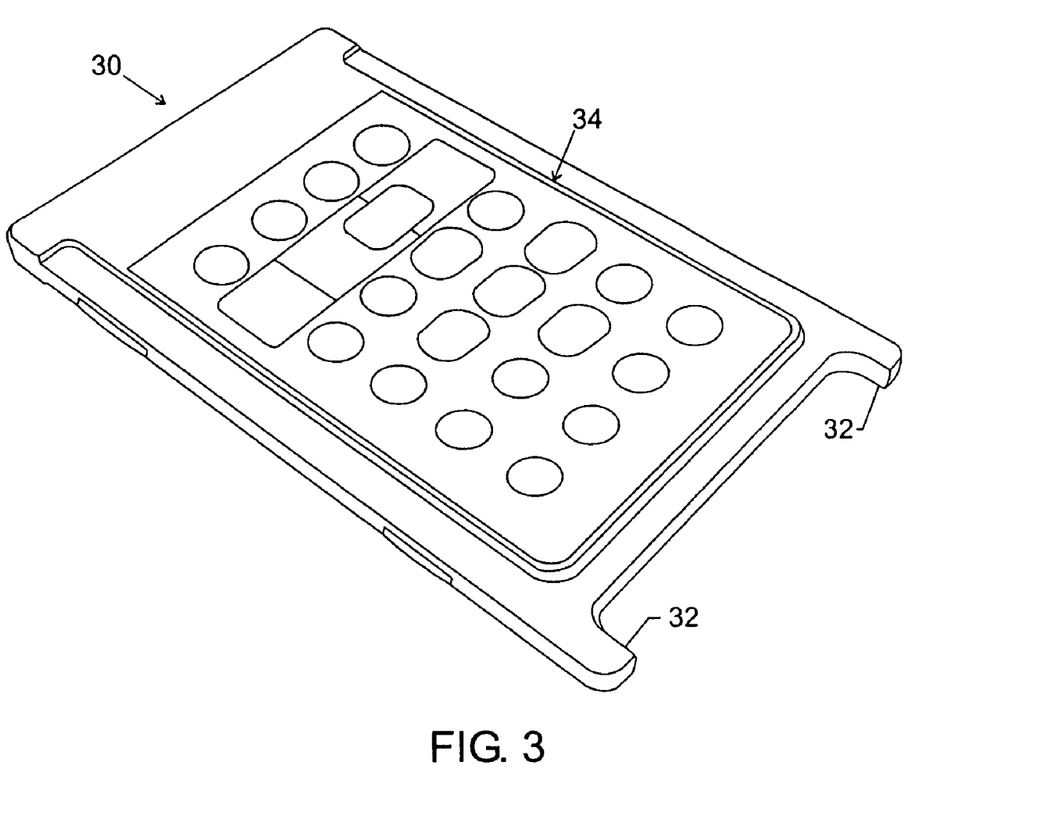
FIG. 3 depicts an embodiment of a remote control device configured to be inserted into a peripheral card slot of an electronic device, in accordance with aspects of the present invention.

For example, referring now to FIG. 3, a remote control 30 is depicted that is configured to be inserted and securely held within a PCMCIA card slot, such as may be found on a portable or handheld computer. In particular, the remote control 30 includes spacers 32 which prevent the remote control 30 from contacting the electrical connectors located in a PCMCIA card slot of an electronic device. In this way, the connectors within the PCMCIA card slot are not damaged by insertion and storage of the remote control 30 into the slot. Furthermore, in one embodiment, the spacers 32 enable an ejection mechanism found within a PCMCIA card slot to eject the remote control 30 when the ejection mechanism is actuated.

In one embodiment, the remote control 30 of FIG. 3 is powered from a battery and does not contact the connectors located within a device bay, e.g., a PCMCIA card slot. In another embodiment, however, the remote control 30 may include receptacles or contacts on the spacers 32 which contact respective power connectors at the end of the bay to enable recharging of a power supply in the remote control.

In this embodiment, the spacers 32 enable the remote control 30 to be charged when stored in a bay but prevent the remote control 30 from contacting or damaging other interface structures within the bay.

Figure 4:
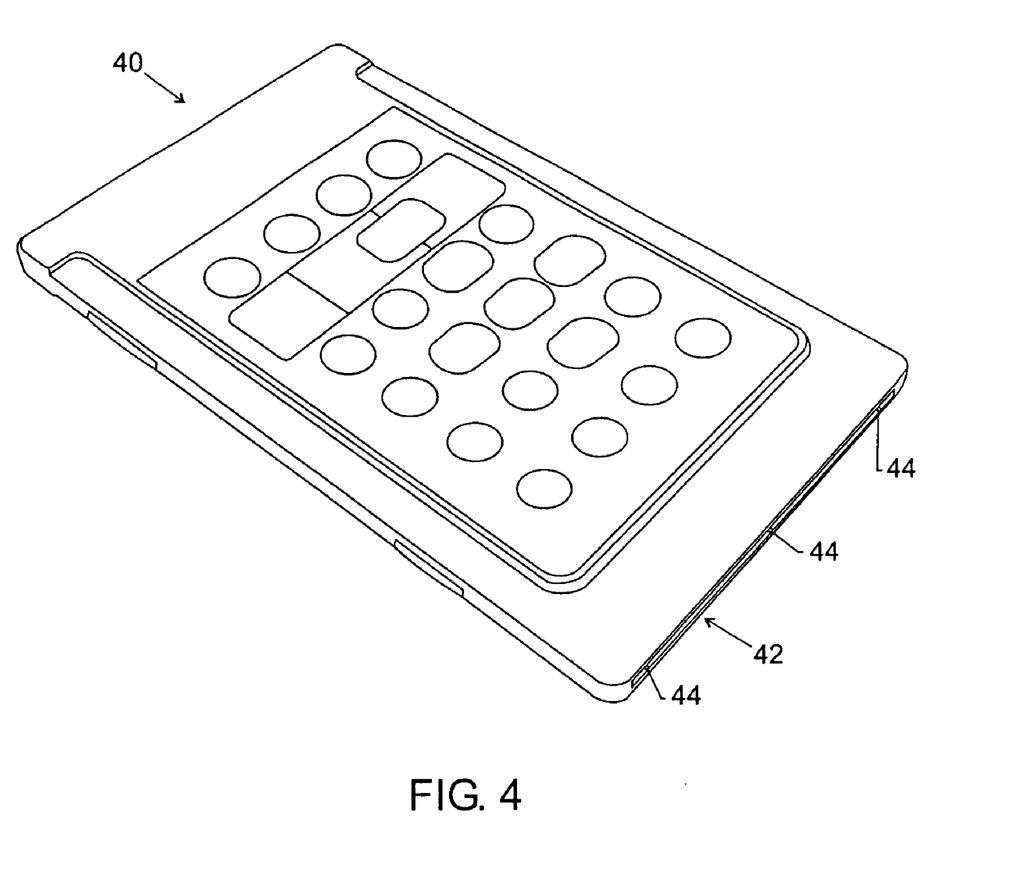
FIG. 4 depicts an embodiment of a remote control device configured to be inserted into a peripheral card slot of an electronic device and to be charged within the slot, in accordance with aspects of the present invention.

Referring now to FIG. 4, an alternative embodiment of a chargeable remote control 40 is provided. As in the preceding embodiment, in this embodiment the chargeable remote control 40 is configured to be charged when stored within a device bay, e.g., a PCMCIA card slot. In particular, the chargeable remote control 40 includes all or part of a charging interface 42 for coupling with connectors within a peripheral card slot. In the depicted embodiment, the charging interface 42 does not include a full complement of receptacles or contacts for engaging the full set of available connectors 46 (depicted in FIG. 5) of the peripheral card slot 14. Instead, the charging interface 42 is configured to connect to some or all of the power pins 48 of the complementary peripheral card slot interface. In the depicted example, the chargeable remote control 40 includes power pin receptacles 44 for engaging and electrically coupling to the power pins of a peripheral card slot, that is, for example, pins 1, 17, 34, 35, 51, and 68 of a PCMCIA card slot. In this way, a battery or other chargeable medium within the chargeable remote control 40 may be charged when control 40 is not in use and while stored in a peripheral card slot or other bay.

Figure 5:
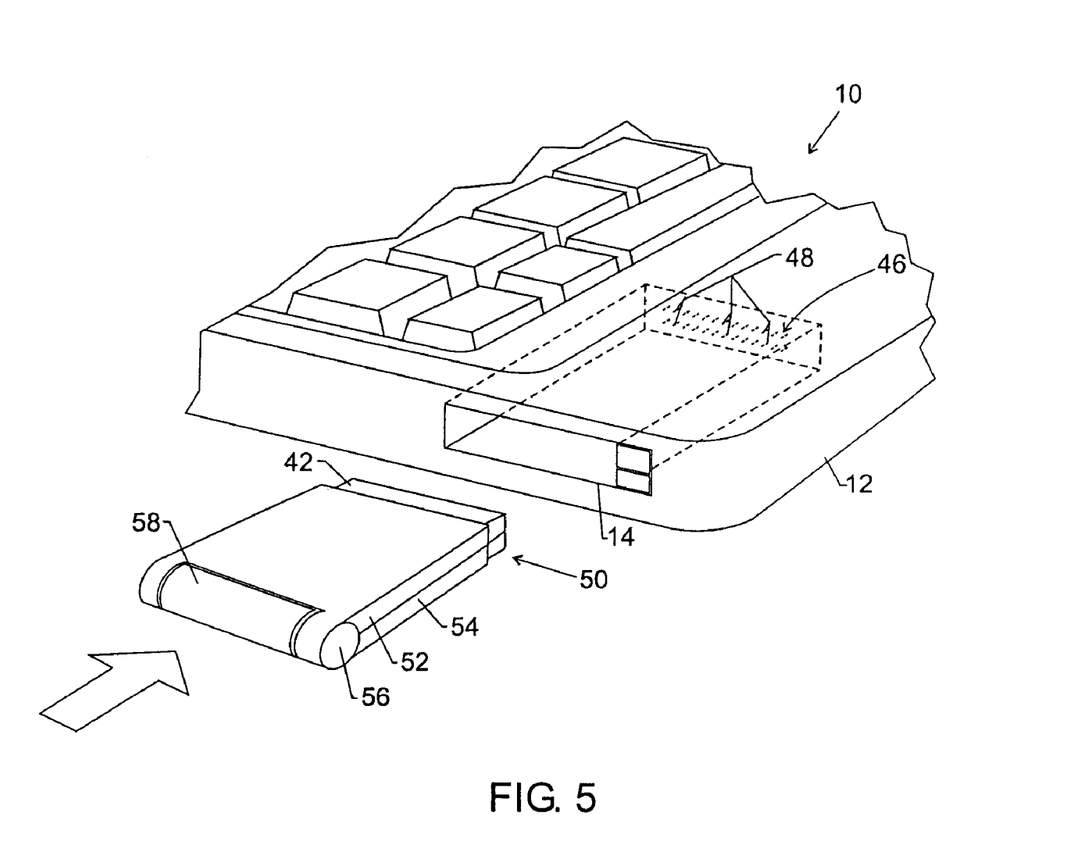
FIG. 5 depicts an embodiment of a foldable game controller configured to be inserted into a peripheral card slot of an electronic device, in accordance with aspects of the present invention.
Figure 6:
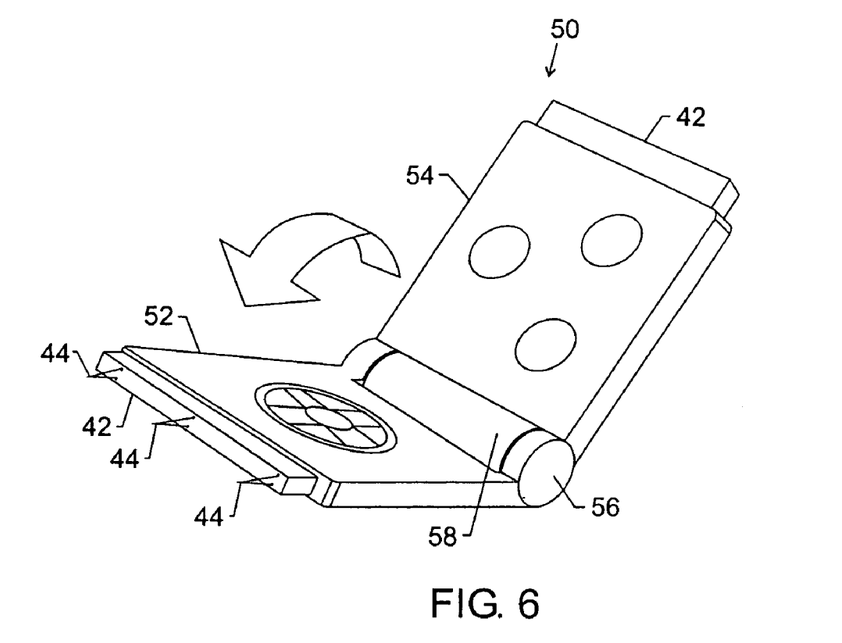
FIG. 6 depicts the foldable game controller of FIG. 5 being unfolded, in accordance with aspects of the present invention.
Figure 7:
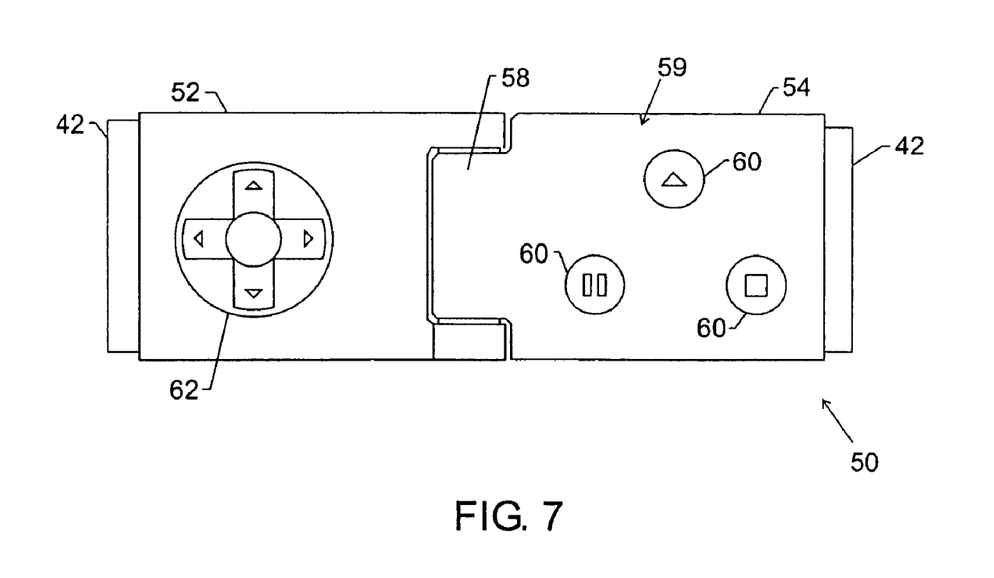
FIG. 7 depicts the foldable game controller of FIG. 5 when unfolded, in accordance with aspects of the present invention.

While remote controls represent one type of electronic apparatus that may be stored within a peripheral card slot or other bay of a portable electronic device, other devices, such as USB hubs or other types of controllers, may also be stored in this manner. For example, referring now to FIG. 5, a foldable game controller 50 is depicted. The depicted game controller comprises a first portion 52 and a second portion 54 connected by a hinge 56. When the two portions 52 and 54 are folded into a closed position, as depicted in FIG. 5, the game controller 50 is insertable into and removable from a pair of vacant peripheral card slots 14. When removed from the peripheral card slots 14 the two portions 52 and 54 of the game controller 50 may be unfolded to an open position, as depicted in FIG. 6, to reveal a game control interface 59, as depicted in FIG. 7. In the depicted embodiment, the game control interface 59 includes action and pause buttons 60 and a directional control 62, such as a joystick interface. The depicted game controller 50 communicates with a suitable gaming device, such as a portable or handheld computer, via wireless means. In this embodiment, the game controller 50 includes a compartment, such as hinge compartment 58, within which a battery is inserted to power the game controller 50. In the depicted embodiment, one or more charging interfaces 42, such as discussed above in connection with FIG. 4, are provided to charge the battery of game controller 50 when stored in the peripheral card slots 14. In particular, the power pin receptacles 44 of the charging interface 42 engage some or all of the respective power pins 48 of the available connectors 46. In other embodiments, the charging interfaces 42 may be absent and the battery is replaced by the user as needed instead of being charged when stored in a respective bay.

Figure 8:
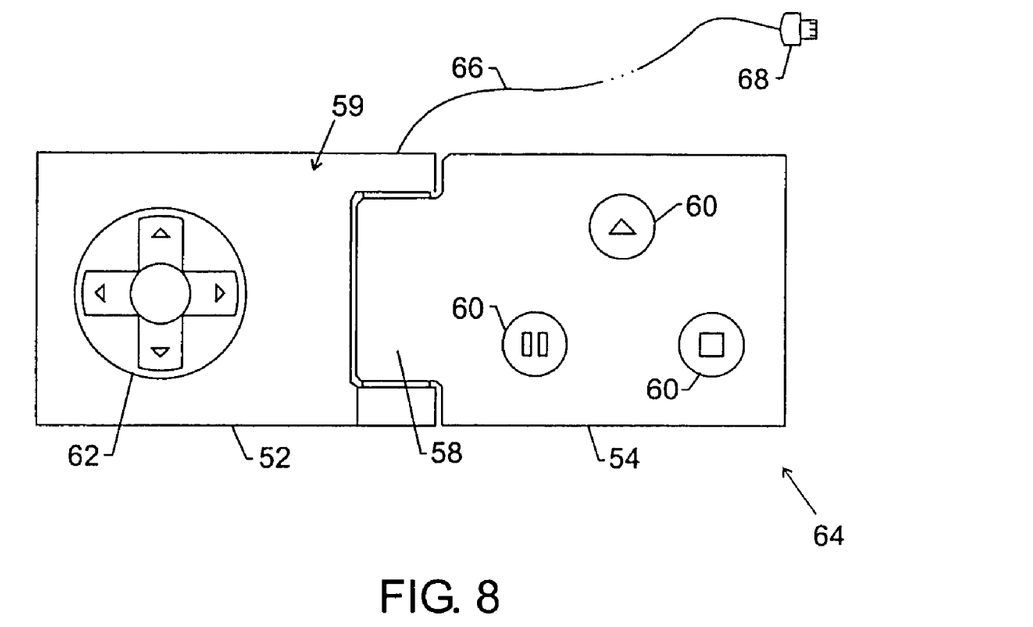
FIG. 8 depicts an alternate embodiment of a game controller including a storable cable, in accordance with aspects of the present invention.

Alternatively, in another embodiment, a cable-connected game controller 64 is provided, as depicted in FIG. 8. In this embodiment, a cable 66 and connector 68, such as a USB connector, may be stored in the hinge compartment 58. In the depicted embodiment, the cable-connected game controller 64 is powered through the cable 66 when the connector 68 is inserted into a complementary receptacle of a gaming device, such as a portable or handheld computer. In other embodiments, the cable-connected game controller 64 may be battery-powered and/or chargeable, as described above. Alternatively, cable 66 and connector 68 do not have to be stored in hinge compartment 58 but may instead be stored as desired within the game controller 64.

Figure 9:
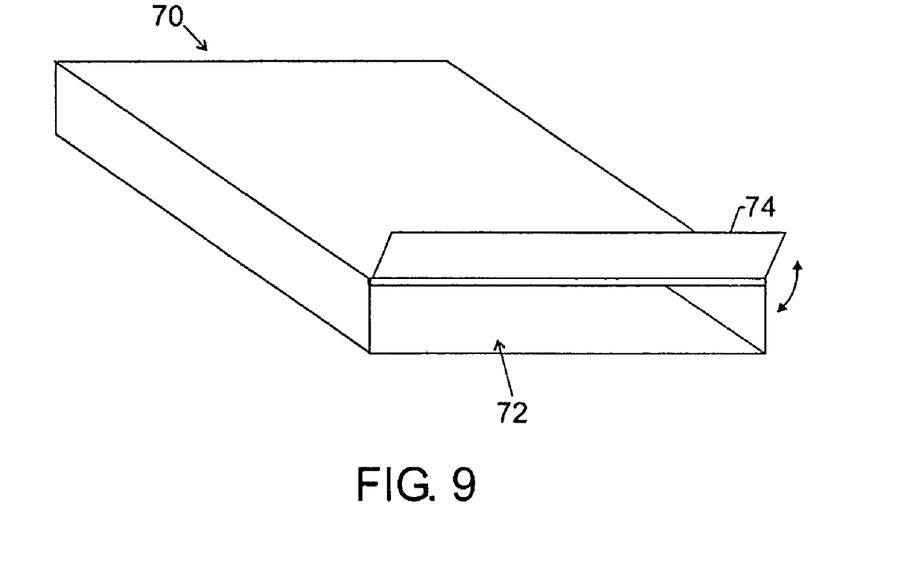
FIG. 9 depicts an embodiment of a storage structure configured to be inserted into a peripheral card slot of an electronic device, in accordance with aspects of the present invention.

While controllers and other input devices represent one type of apparatus which may be inserted for storage within a bay of an electronic device, other types of devices and/or structures may also stored in this manner. For example, a storage structure 70 configured to be stored in a slot or bay of an electronic device is depicted in FIG. 9. The storage structure 70 encloses a storage space 72, which can be accessed by moving all or part of a movable section 74 of the storage structure housing. For example, in the depicted embodiment, a hinged movable section 74 of the storage structure housing is such that the movable section 74 may be rotated between open and closed positions. In other embodiments, the movable section 74 may be configured to slide between open and closed positions or may be configured to move in other ways known to those of ordinary skill in the art.

The accessible storage space 72 may be used to store media, such as memory cards or memory sticks, for use with a reader of the electronic device or another electronic device. Though the storage of memory media is one possibility, in practice, any item or items of interest capable of fitting into the storage structure 70 may be stored by a user. For example, replacement parts, such as screws, nuts, bolts, etc., for equipment may be stored in the storage space 72. Similarly, office supplies, such as paper clips, rubber bands, adhesive flags, and so forth, may be stored in the storage space 72 if a user so desires. The storage structure 70, thus, comprises a storage device or compartment that can repeatedly be inserted into and removed from a bay of an electronic device.

Figure 10:
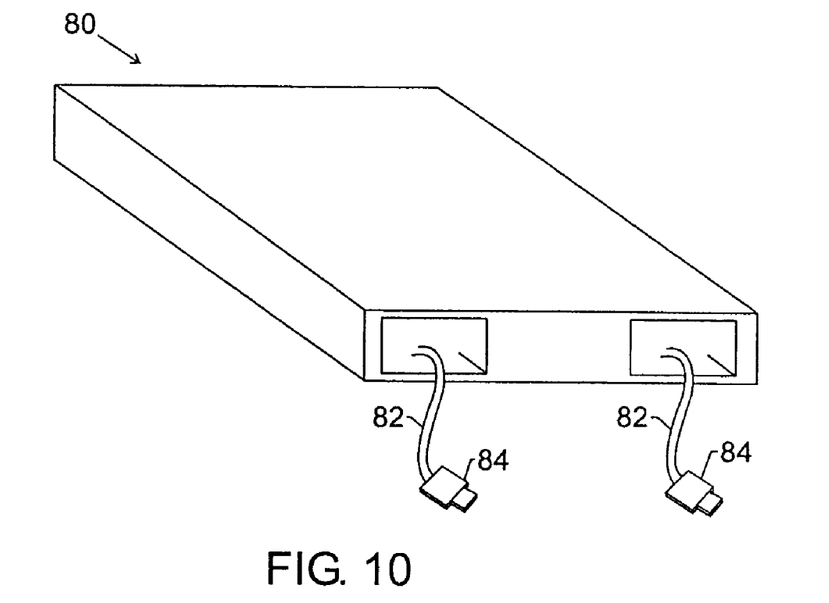
FIG. 10 depicts an embodiment of a cable storage structure configured to be inserted into a peripheral card slot of an electronic device, in accordance with aspects of the present invention.

Likewise, in one embodiment depicted in FIG. 10, a cable storage structure 80 is provided which is configured to be stored in a slot or bay of an electronic device. The depicted cable storage structure 80 is configured to store at least one type of cable 82, such as network cable, telephone cable, USB cable, and so forth. When in use, the stored cable 82 is withdrawn from the cable storage structure 80 and used to connect respective sockets or plugs that the connectors 84 are configured to fit. In the depicted embodiment, the cable 82 is accessible when the cable storage structure 80 is stored in a slot or bay of an electronic device, though this need not be the case in all embodiments.

Figure 11:
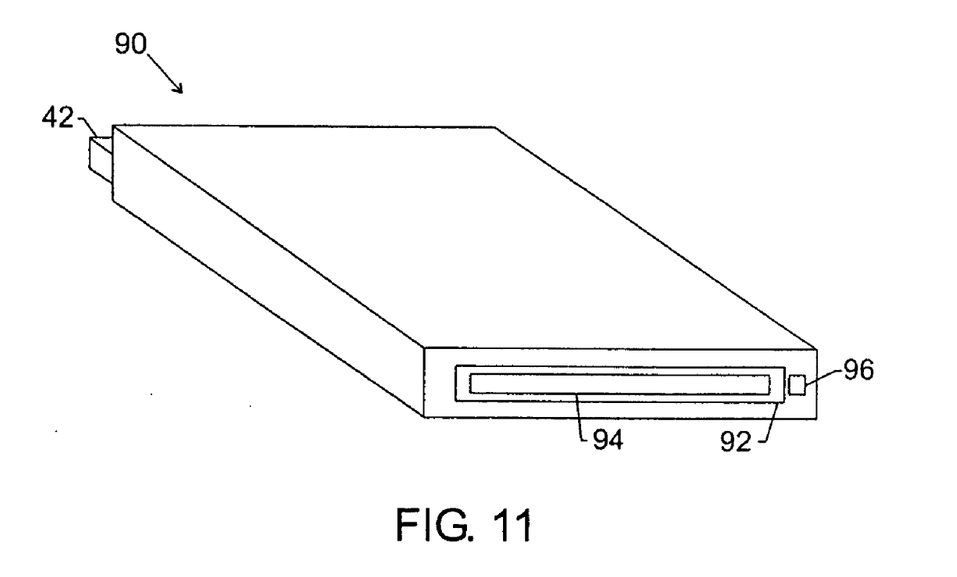
FIG. 11 depicts an embodiment of a battery charging structure configured to be inserted into a peripheral card slot of an electronic device, in accordance with aspects of the present invention.

In an additional exemplary embodiment depicted in FIG. 11, a charging structure 90 is provided. The charging structure 90 includes a charging interface 42 that may be used to connect to some or all of the power pins of a peripheral card slot, such as a PCMCIA slot, or other power connectors in the bay into which the charging structure 90 is inserted. In the depicted embodiment, the charging structure 90 includes a battery receptacle 92 configured to receive one or more batteries 94 for charging. The depicted charging structure 90 also includes a battery ejection mechanism, which is activated by the ejection button 96, to facilitate the unloading of the battery 94 from the structure 90. In other embodiments, no ejection mechanism may be provided other than the force applied by a user to overcome a resistive force holding the battery 94 in the charging structure 90.

Figure 12:
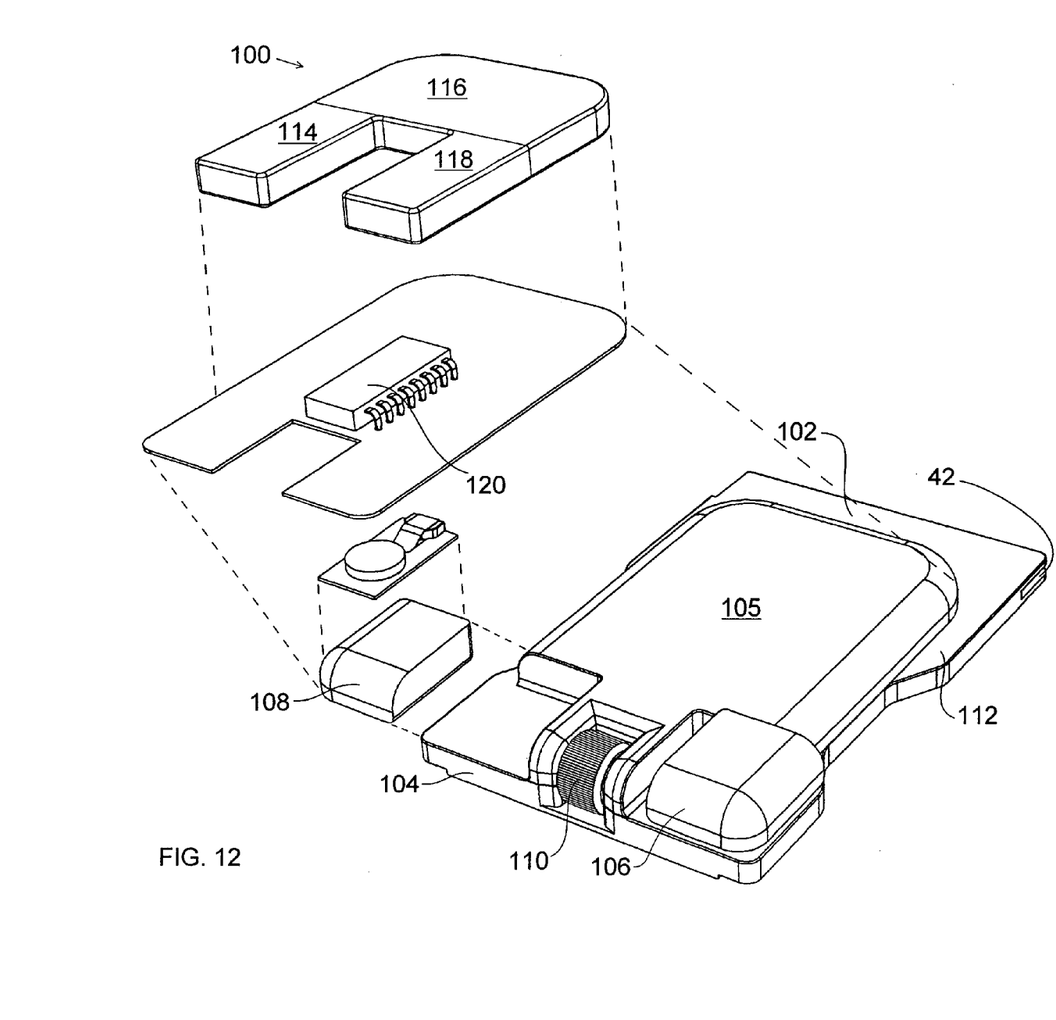
FIG. 12 depicts in a somewhat schematic and partly exploded view an embodiment of a mouse configured to be inserted into a peripheral card slot of an electronic device, in accordance with aspects of the present invention.

Referring now to FIG. 12, another embodiment of a storable structure, indicated generally by the reference sign 100, is a mouse. The mouse 100 may be an optical mouse and is powered by a rechargeable battery 116 in the mouse. In use, the mouse 100 communicates wirelessly with the portable computer 10 or other portable electronic device. For example, the mouse 100 may be configured to communicate with a Bluetooth radio networking device with which the portable computer 10 or other portable electronic device is equipped.

In the embodiment shown in FIG. 12, the mouse 100 is formatted as a device to fit in a PCMCIA Type III device bay 14 (see FIG. 5). However, the mouse 100 may alternatively be of another shape and/or size, to fit in another format of device bay 14. A PCMCIA Type III device is nominally 85.6 mm long, 54 mm wide, and 10.5 mm thick. This is smaller than a typical computer mouse but is large enough for the embodiment of the mouse 100 shown in FIG. 12 to be ergonomically acceptable in ordinary use. At one end 102, the end that is inserted farthest into a PCMCIA bay, the mouse 100 is thinned to a thickness of approximately 3 mm, and terminates in a charging interface 42 similar to that shown in FIG. 4. As is shown for the connectors 46 in FIG. 5, the interface in a PCMCIA Type III bay 14 consists of two PCMCIA Type I/II connectors one alongside the other, so that the PCMCIA Type III slot can be used for two PCMCIA Type I/II devices. The charging interface 42 of the mouse 100 is arranged to engage with one of the two connectors 46 in the bay 14. The PCMCIA standard allows for power pins in the interface that are not controlled by a device driver in the host computer. Therefore, the mouse 100 can be configured to connect to the power pins without connecting to any data pins, and without needing a PCMCIA device driver to be installed. The battery in the mouse 100 is then charged under control of a charger 118 in the mouse, while the PCMCIA bay passively supplies power to the charger. The charging interface 42 in the mouse may consist of a standard connector with only the power pins, and not the data pins, operatively connected within the mouse.

At the other end 104, which is towards the user's fingers when the mouse 100 is in use, the mouse in the embodiment has a body 105 rising to the full 10.5 mm height allowed by the PCMCIA Type III format. The mouse may be thinner than 10.5 mm. The full height of the mouse 100 is continued from the finger end 104 for most of the length and width of the mouse. A thinner or thicker format may be utilized.

In the embodiment, the finger end 104 of the mouse 100 has two mouse buttons 106, 108 and a scroll wheel 110. Other arrangements are possible, including a mouse with three mouse buttons or a mouse with two buttons and no scroll wheel. When the mouse 100 is inserted in a PCMCIA bay, the finger end 104 of the mouse 100 is typically exposed in the mouth of the bay. The finger end 104 of the mouse 100 is therefore preferably generally flat and flush with the surface of the computer 12 that surrounds the PCMCIA bay 14. In an alternative embodiment, the finger end 104 of the mouse 100 can project outside of the computer 12 a short distance when the mouse is fully inserted in the PCMCIA bay 14. In that alternative embodiment the mouse 100 is longer than the standard length of the PCMCIA bay 14. In a further alternative embodiment the projecting finger end can be thicker than the height of the PCMCIA bay 14. However, as may be seen from FIG. 12, the finger end 104 of the mouse 100 does not need to occupy the entire rectangular shape of the mouth of the PCMCIA bay 14. In the embodiment, the sides 112 of the mouse 100 are the same thickness as the end 102 with the power connector 42, in order to fit under the guide rails that are present along the sides of a PCMCIA Type III bay 14. In an alternative embodiment, the finger end 104 of the mouse 100 can project outside of the computer 12 a short distance when the mouse is fully inserted in the PCMCIA bay 14. In that alternative embodiment the mouse 100 is longer than the standard length of the PCMCIA bay 14. In a further alternative embodiment the projecting finger end can be thicker than the height of the PCMCIA bay 14.

The body 105 of the mouse may contain a transmitter 114 for the Bluetooth or other wireless connection, the rechargeable battery 116, the battery charger 118 for controlling the charging of the battery 116 from the continuously powered power pins of the connector 46, and the tracker and transducers 120 for movement of the mouse, clicks of the buttons 106, 108, and movement of the scroll wheel 110, that provide the actual mouse functionality.

In use, the mouse 100 is ejected from the PCMCIA bay 14 and is used as an ordinary cordless mouse. The mouse is used as seen from above in FIG. 12, with the full height at the finger end 104 and over the middle part 105 of the mouse, and with the thin end 102 and thin sides 112 downwards towards a mouse pad or other surface on which the mouse is being used. In this configuration, the user can grasp the middle part 105 of the mouse, and the heel of the user's hand can rest on the thin end 102. When not in use, the mouse 100 can be inserted in the PCMCIA bay 14, where the mouse can recharge its battery. In the PCMCIA bay 14, the mouse 100 is out of the way, is protected from loss or damage, and remains with the computer 10 so that it is reliably available when it is wanted. No separate charging device or cord is needed for the mouse 100. For example, once inserted into the bay, the finger end 104 can be flush with a side or end of the electronic device. As such the mouse 100 will not protrude or project outwardly from the housing of the electronic device.

While the preceding examples provide some idea of the scope and variety of storable structures encompassed by the present technique, it is to be understood that these examples are merely illustrative and are not intended to exclusively list the range of possibilities. Indeed, one of ordinary skill in the art will appreciate that other storable structures encompassing other functionalities than those presently described are within the scope of the present disclosure.

What is claimed is:

1. A rechargeable mouse adapted to be insertable into and removable from a bay of an electronic device, wherein an electrical connection of the mouse directly contacts a power connection of an electrical interface affixed in the bay that also has a data connection such that the mouse is charged when inserted in the device bay, and the rechargeable mouse further comprises a connection that connects mechanically to said power connection and to said data connection, and wherein part of said connection of said mouse that connects mechanically to said data connection is not electrically connected within said mouse.

2. A mouse according to claim 1, wherein the power connection comprises at least two power pins.

3. A mouse according to claim 1, further comprising a rechargeable battery.

4. A mouse according to claim 3, further comprising a battery charger.

5. A mouse according to claim 1, wherein the bay is a peripheral card slot.

6. A mouse according to claim 5 wherein the peripheral card slot is a Personal Computer Memory Card International Association (PCMCIA) card slot.

7. A mouse according to claim 1, further comprising a transmitter for cordless communication from the mouse to the electronic device.

8. An electronic device, comprising:
an apparatus having a bay adapted to receive a removable unit, the bay having an electrical interface therein adapted to engage a connection on the removable unit to transmit power and data to the removable unit; and a rechargeable mouse adapted to reside in the bay, wherein electrical connection of the mouse directly contacts a power portion of the electrical interface affixed in the bay such that the mouse is charged when it resides in the bay;

wherein the bay is adapted to receive storage media when the mouse is removed from the bay.

9. The electronic device of claim 8, wherein, when the mouse resides in the bay, a body of the mouse is fully enclosed in the bay such that the body does not protrude from the apparatus.

10. The electronic device of claim 8, wherein the mouse comprises a rechargeable battery that recharges while the mouse resides in the bay.

11. The electronic device of claim 10, wherein the mouse comprises a battery charger arranged to charge the battery.

12. The electronic device of claim 8, wherein the bay comprises at least one PCMCIA card slot.

13. The electronic device of claim 8, wherein the mouse comprises a transmitter and the apparatus comprises a corresponding receiver for cordless control of the apparatus by the mouse.

* * * * *